(12) United States Patent
Nguyen et al.

(10) Patent No.: US 12,039,989 B2
(45) Date of Patent: Jul. 16, 2024

(54) ECHO CANCELLER WITH VARIABLE STEP-SIZE CONTROL

(71) Applicant: SEMICONDUCTOR COMPONENTS INDUSTRIES, LLC, Phoenix, AZ (US)

(72) Inventors: Thi Hong Thu Nguyen, Ichinomiya (JP); Kozo Okuda, Hirakata (JP)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 274 days.

(21) Appl. No.: 17/645,400

(22) Filed: Dec. 21, 2021

(65) Prior Publication Data
US 2022/0310106 A1    Sep. 29, 2022

Related U.S. Application Data

(60) Provisional application No. 63/167,384, filed on Mar. 29, 2021.

(51) Int. Cl.
*G10L 21/0208* (2013.01)
*G10K 11/04* (2006.01)
(Continued)

(52) U.S. Cl.
CPC .......... *G10L 21/0208* (2013.01); *G10K 11/04* (2013.01); *G10K 11/17854* (2018.01);
(Continued)

(58) Field of Classification Search
CPC ...... G10L 21/0208; G10L 2021/02082; G10K 11/17854; G10K 11/04; H04R 3/00; H04R 2400/01
See application file for complete search history.

(56) References Cited

U.S. PATENT DOCUMENTS 9,001,994 B1 *   4/2015  Yang ..................... H04M 9/082
                                                 379/406.14
11,539,833 B1 * 12/2022  Nakagawa ............... H04R 3/02
(Continued)

FOREIGN PATENT DOCUMENTS

CN         101119135 A  *  2/2008
WO    WO-2019044176 A1  *  3/2019  ............ H04M 3/002

OTHER PUBLICATIONS

Benesty, Jacob, et al., "A New Class of Doubletalk Detectors Based on Cross-Correlation", IEEE Transactions on Speech and Audio Processing, vol. 8, No. 2, Mar. 2000, pp. 168-172.
(Continued)

*Primary Examiner* — David L Ton
(74) *Attorney, Agent, or Firm* — Brake Hughes Bellermann LLP (57) ABSTRACT

An acoustic echo canceller (AEC) uses a simulated echo from an adaptive filter to cancel an actual echo from a real environment. The echo cancellation is optimal when the adaptive filter response accurately matches the environment response. This can be achieved by changing coefficients of the filter in a step-wise fashion until the filter is converged on a configuration that provides optimal results. The convergence of the filter can be negatively affected by interference due to a double talk event or by an event in which the environment is changed. The disclosed AEC is configured to respond to these disruptive events by adjusting a step-size of the adaptive algorithm used to change the coefficients.

19 Claims, 6 Drawing Sheets

(51) Int. Cl.
*G10K 11/178* (2006.01)
*H04R 3/00* (2006.01)

(52) U.S. Cl.
CPC ...... *H04R 3/00* (2013.01); *G10L 2021/02082* (2013.01); *H04R 2400/01* (2013.01)

(56) References Cited

U.S. PATENT DOCUMENTS

| | | |
|---|---|---|
| 2003/0174661 A1 | 9/2003 | Lee |
| 2008/0240413 A1 | 10/2008 | Mohammad et al. |
| 2013/0315408 A1* | 11/2013 | Yano ................ G10K 11/17854 381/71.11 |
| 2021/0195324 A1* | 6/2021 | Tateishi ................ H04R 3/007 |

OTHER PUBLICATIONS

Kwong, Raymond H., et al., "A Variable Step-Size LMS Algorithm", IEEE Transactions on Signal Processing, vol. 40, No. 7, Jul. 1992, pp. 1633-1642.

Schuldt, Christian, et al., "A Delay-Based Double-Talk Detector", IEEE Trans. Audio, Speech, and Language Processing, vol. 20, No. 6, Aug. 2012, pp. 1725-1733.

\* cited by examiner

ECHO CANCELLER WITH VARIABLE STEP-SIZE CONTROL

CROSS-REFERENCE TO RELATED APPLICATION

This application claims the benefit of U.S. Provisional Application No. 63/167,384, filed on Mar. 29, 2021, which is hereby incorporated by reference in its entirety.

FIELD OF THE DISCLOSURE

The present disclosure relates to adaptive signal processing and more specifically to an apparatus and method for echo cancellation that can adaptively respond to changing conditions.

BACKGROUND

In an acoustic system, an acoustic echo is a delayed version of a sound (e.g., speech) recorded by a microphone capturing sounds from an environment that is co-located with a speaker playing the sounds to the environment. The delayed version of the sound may be created by the sound from the speaker interacting (e.g., reflecting) with the environment before being captured by the microphone. An acoustic echo canceller (AEC) may be used to reduce, or eliminate, the echo by destructively combining the delayed version of the sound (i.e., the echo) with an echo based on a model of the environment (i.e., estimated echo). Accordingly, it is advantageous for an AEC to accurately model (i.e., estimate) the environment. Further, when an accuracy of the model is negatively affected by changes to the environment or by acoustic events (e.g., double-talk), it may be advantageous for the AEC to quickly and accurately re-converge on an accurate model.

SUMMARY

In at least one aspect, the present disclosure generally describes an audio system. The audio system includes a speaker that is configured to play a transmitted signal to an environment. The audio system further includes a microphone that is configured to receive a received signal from the environment, where the received signal includes an echo of the transmitted signal. The audio signal further includes an echo canceller that is configured to cancel the echo of the transmitted signal from the received signal. The echo canceller includes an adaptive filter. The adaptive filter is configured to model the environment to generate an echo estimate. The echo estimate is subtracted from the received signal to cancel the echo of the transmitted signal from the received signal. The adaptive filter is configured to detect an event that causes a loss of convergence of the adaptive filter. The adaptive filter is further configured to determine, during the event, an active step size according to a finite state machine and adjust the adaptive filter according to the active step size.

In another aspect, the present disclosure generally describes a method for echo cancellation. The method includes receiving a received signal from an environment, which includes an echo of a transmitted signal. The method further includes generating an echo estimate using an adaptive filter that is configured to model the environment. The method further includes subtracting the echo estimate from the received signal to cancel the echo of the transmitted signal from the received signal. The method further includes detecting an event that causes a loss of convergence of the adaptive filter. The method further includes determining during the event, an active step size according to a finite state machine and adjusting the adaptive filter according to the active step size.

In another aspect, the present disclosure generally describes an echo canceller for an acoustic device. The echo canceller includes a finite impulse response (FIR) filter having coefficients to generate an echo estimate that is an estimate of an echo generated by an environment. The echo canceller further includes a coefficient calculation block that is configured to apply a normalized least means squared (NLMS) algorithm to adjust the coefficients of the FIR filter to minimize a difference between a response of the filter and the response of an environment. The echo canceller further includes a step-size controller that is configured to adjust an active step size of the NLMS algorithm during an event according to a finite state machine. The event being a double talk event or an environment change event.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
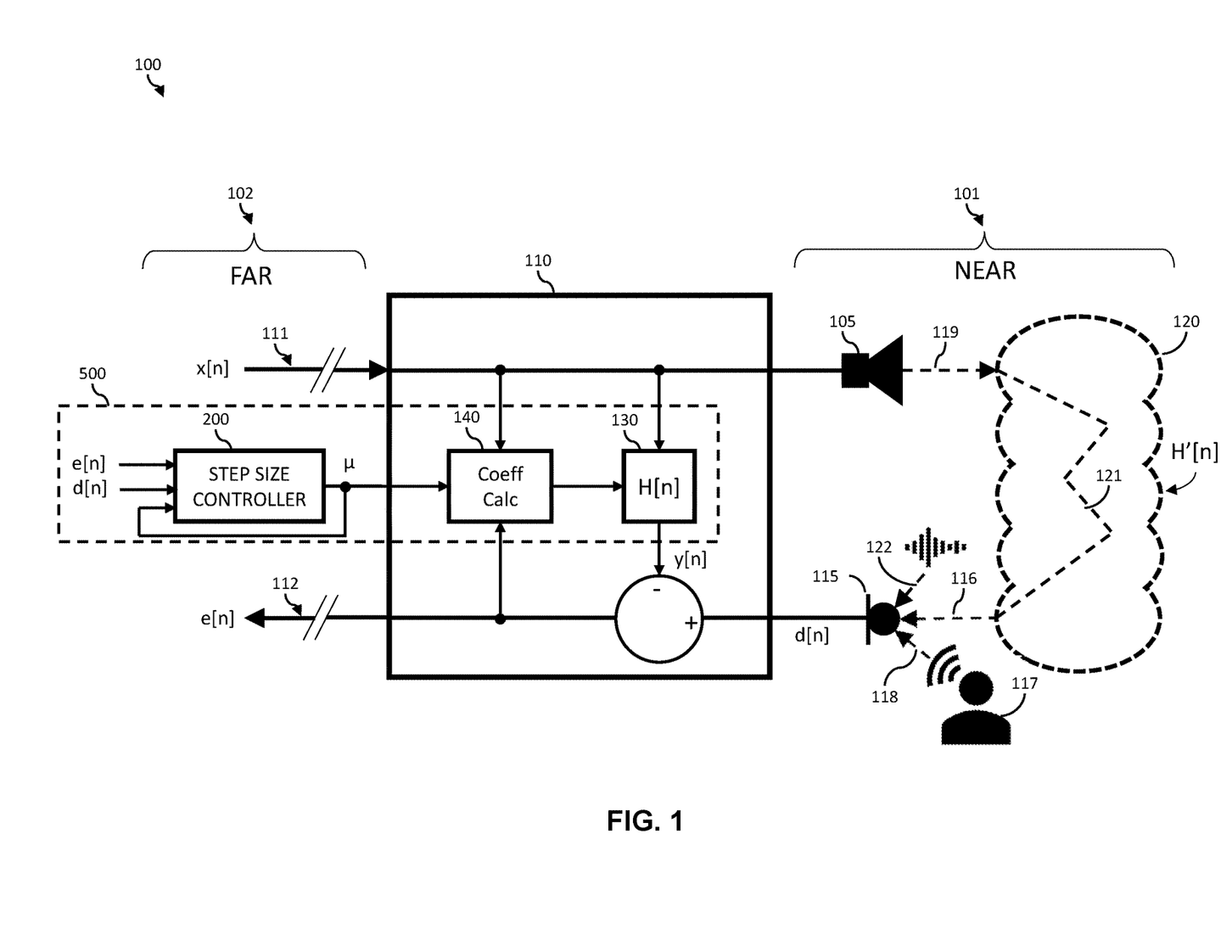
FIG. 1 is a block diagram of an acoustic system including an acoustic echo canceller according to an implementation of the present disclosure.

FIG. 1 illustrates an acoustic system according to an implementation of the present disclosure. The audio system 100 includes an acoustic echo canceller (i.e., AEC 110) coupled between audio components in a first location (i.e., near-side, near-end) and audio components in a second location (i.e., far-side, far-end). For example, the audio components at the near-end 101 may include a near speaker 105 and a near microphone (i.e., near mic 115), while audio components at the far-end 102 may include a far microphone (not shown) and a far speaker (not shown).

The AEC 110 may be configured to receive a far-side input signal (i.e., reference signal (x[n])) at a reference input 111 and transmit an output signal (e[n]) at an AEC output 112. For example, the reference signal x[n] may be speech from a far user at the far-end 102 captured by a far mic (not shown). The output signal (e[n]) may be sounds from the near-end 101 after echoes of the speech from the far user have been reduced or removed.

The reference signal (x[n]) is coupled to the near speaker 105, which is configured to transmit sounds corresponding to the reference signal (x[n]) into an environment 120 (e.g., room). The environment 120 may reflect, or otherwise delay, the sounds according to an echo path 121. As a result, the near mic 115 may receive a delayed version of the reference signal (i.e., an echo 116) from the environment. This echo 116 may be fed back to the source (e.g., the far user at the far-end) if not reduced (e.g., removed). For example, if the echo is not removed a far user at the far-end may hear a delayed version of his/her own voice.

The AEC 110 is configured to also couple the reference signal (x[n]) to a filter 130 having a filter transfer function (H[n]) (i.e., filter response) that corresponds to an estimate of the environment 120. In other words, the environment may filter the reference signal according to an unknown transfer function (H'[n]) (i.e., environment response). By estimating this unknown transfer function (i.e., by estimating the environment), the filter 130 may alter (i.e., change, affect) the reference signal (x[n]) in the same way that the echo path 121 of the environment 120 creates the echo 116. Accordingly, an output of the filter 130 can be an estimate of the echo (i.e., echo estimate (y[n]).

The AEC 110 can be configured to compute a difference between the echo 116 and the echo estimate (y[n]) so that when the echo estimate (y[n]) matches the echo, the echo 116 an be canceled from the near-side input signal (i.e., input signal (d[n])) captured by the near mic 115 and output as an output signal (e[n]). In other words, the output signal (e[n]) can be a version of the input signal (d[n]) with the echo reduced or removed. The output signal (e[n]) may be transmitted back to the far user at the far-end 102 where it can be played on a far speaker (not shown).

The far mic, the far speaker, and the far user at the far end are not shown in FIG. 1 because two-way communication is not the only possible application of the AEC 110 as disclosed. For example, the AEC 110 may be part of a smart speaker. Here, the AEC 110 can be used to aid speech recognition algorithms (i.e., programs) running on the smart speaker to understand speech (e.g., commands) spoken by a near user 117 at the near-end 101. In general, the disclosed AEC may be used in a variety of possible applications, and therefore, a description of a particular application is not necessarily limiting.

A degree to which the echo 116 is cancelled from the output signal (e[n]) may correspond to an accuracy of the filter 130 to act as a simulated environment (i.e., environment model). The filter 130 may include coefficients (i.e., weights) that can be adjusted so that the filter's effect on the reference signal (x[n]) is well matched to the environment's effect on the played reference signal 119 (i.e., transmitted signal). When the filter 130 includes coefficients that accurately estimate (i.e., model) the environment 120, the echo 116 is sufficiently (e.g., completely) canceled from the output signal (e[n]), and the filter 130 is said to be converged. When the filter 130 includes coefficients that do not accurately estimate (i.e., model) the environment 120, the echo 116 is not sufficiently (e.g., completely) canceled from the output signal (e[n]), and the filter 130 is said to be not converged. The AEC 110 can be configured to adapt (i.e., update) the coefficients (i.e., weights) of the filter to adapt to changing conditions so that after a changed condition, an iterative algorithm may converge the filter coefficients on an updated model of the environment.

The AEC 110 includes a coefficient calculation block 140 that is configured to compute the coefficients for the filter based on the reference signal (x[n]) and the output signal (e[n]). For example, an estimate of an environment channel (i.e., the environment 120) can be calculated using the equation below.

$$H_{n+1} = H_n + 2\mu e_n x_n \quad (1)$$

In the equation above $H_{n+1}$ is a an adjusted filter coefficient of the current iteration, $H_n$ is a filter coefficient of a previous iteration, $\mu$ is a step size, the $e_n$ is the value of the output signal, and $x_n$ is the value of the reference signal.

The coefficient calculation block 140 may be configured to compute coefficients for the filter 130 using an iterative optimization algorithm to minimize an error between the estimated environment and the actual environment. For example, a normalized least means squares (NLMS) algorithm may be used to adjust the coefficients in steps. If the error increases with a step, then the coefficients can be changed (e.g., reduced) in a next step to reduce the error. Conversely, if the error decreases with a step, then the coefficients can be alternatively changed (e.g., increased) in a next step to further reduce the error. As the algorithm steps, the coefficients can converge on values that minimize the error so that over a plurality of steps the filter (H[n]) is made to substantially match the environment (H'[n]).

The step size ($\mu$) of the algorithm can correspond to an amount of change in the coefficients for a step. A larger step size may correspond to larger coefficient changes between steps. This may be useful for quickly minimizing large errors (i.e., fast convergence), but may make finding a minimum (i.e., converging) more difficult. A smaller step size may accurately converge on a minimum but may be slow (i.e., slow convergence). When responding to an event that can cause the AEC to lose convergence, it may be advantageous to have an adjustable step size to balance speed with accuracy.

The coefficient calculation block 140 may require a period of adaptation to converge on coefficients that provide a filter that matches the filtering qualities of the environment. When the filter is adapted to minimize the error as described above the filter is well matched to the environment and has a good convergence (i.e., is converged). When the filter is not adapted and the error is not minimized, the filter is not well matched to the environment and does not have good convergence (i.e., is not converged, has a loss of convergence).

The quality of the filter for echo cancellation may be measured by quality of convergence, which relates to convergence parameter based on a cross-correlation and a variance, as shown in the equation below.

$$\zeta_{MECC} = 1 - \frac{r_{de}}{\sigma_d^2} \quad (2)$$

In the equation above, $r_{de}$ is the cross-correlation between the output signal (e[n]) (i.e., the echo-cancelled signal) and the input signal (d[n]) (i.e., the received signal) and $(\sigma_d)^2$ is the variance of the input signal (d[n]) (i.e., the received). A quality of the echo cancellation and/or an event can be determined by a value of the convergence parameter. For example, when there are no interfering sounds at the near-end 101, such as near-end speech 118 and/or noise 122 (i.e., no double-talk), the filter is converged for the input signal and the echo can be canceled to a high degree (e.g., completely). In this situation, the variance $(\sigma_d)^2$ may be very low (e.g., $\sigma_d^2 \leq 0.01$) and the quality of the convergence can be approximately unity (i.e., $\zeta_{MECC} \approx 1$). When there are interfering sounds (i.e., double-talk) at the near-end 101 or when the environment has changed, however, the variance may increase (e.g., $\sigma_d^2 \geq 0.1$), thereby reducing the quality of convergence from approximately unity to a value less than unity (i.e., $\zeta_{MECC} \leq 0.95$). Events that can cause the quality of convergence ($\zeta_{MECC}$) to decrease can include a change to the environment or a double talk event.

A change in the environment can cause the filter of the AEC to lose convergence (i.e., $\zeta_{MECC} < 1$). Returning to FIG. 1, when the environment 120 is changed the played reference signal 119 may experience a different echo path so that the echo 116 of the input signal (d[n]) no longer matches the echo estimate signal (y[n]). Changes to the environment may include moving objects and/or entities (e.g., people) out of the environment, into the environment, and/or within the environment. Changes to the environment may further include moving the audio system 100 from one environment (e.g., a first room) to another environment (e.g., a second room).

A double-talk event can also cause the filter of AEC to lose convergence (i.e., $\zeta_{MECC} < 1$). A double-talk event may be caused by one or more other sound sources at the near-end 101. For example, a double-talk event (i.e., double-talk) may include near-end speech 118 received at the near mic 115 while the echo 116 is received at the near mic 115. Likewise, a double-talk event may include noise 122 received at the near mic 115 while the echo 116 is received at the near mic 115. The near-end speech 118 and/or the noise 122 may cause the coefficient calculation block 140 to adapt the filter 130 incorrectly. Accordingly, a determination of an event (e.g., change in environment, double-talk) may be useful to choose how or when to update the coefficients of the filter 130.

A double-talk event or a change in environment event (i.e., an event) may be detected by comparing the quality of convergence ($\zeta_{MECC}$) to a threshold (e.g., threshold=0.95). Accordingly, when $\zeta_{MECC}$ is approximately unity (e.g., $\zeta_{MECC}$>threshold), no event is detected, and when $\zeta_{MECC}$ is less than unity (e.g., $\zeta_{MECC} \leq$ threshold) an event is detected. When an event is detected, it may be necessary to change how the coefficient calculation block 140 operates. For example, while a double-talk event is detected, the coefficient calculation block 140 may be stopped (i.e., paused) to avoid adapting the filter based on feedback that could lead to a loss of convergence (e.g., feedback from interfering sounds, feedback from an environment change). The adaptation can be stopped (i.e., paused) temporarily by setting the step size (μ) to zero (see Equation 1). While the adaptation is stopped, the AEC may continue using the coefficients for the filter that were calculated prior to the double-talk event. After the event, adaptation may be resumed by setting the step size back to its value before the event. Accordingly, it may be necessary to store this step size during the event. As will be described, the disclosed AEC includes additional alternatives besides stopping (i.e., pausing) the adaptation while an event is detected.

A speed that the coefficient calculation block 140 can respond to an event (i.e., double-talk, environment change) is known as a speed of convergence (i.e., convergence speed). The convergence speed can correspond to a step size (i.e., μ) selected for the coefficient calculation. It may be desirable for a step size to be large so that the filter can be adapted (i.e., converged) quickly in response to the event. A large step size, however, can reduce a precision of the convergence. While it may be desirable to choose a single step size to balance speed and precision for all scenarios, this may not be possible.

Figure 2:
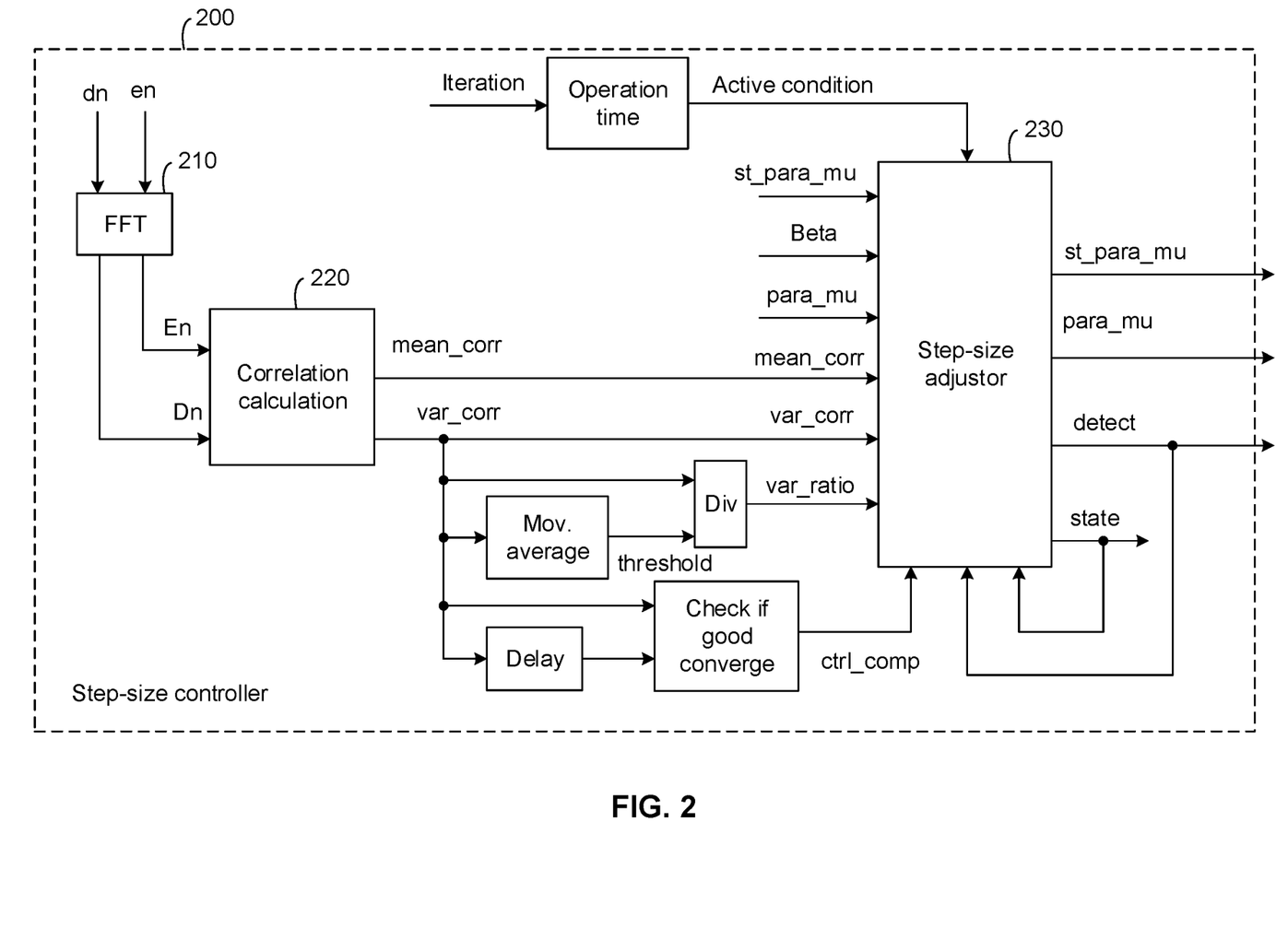
FIG. 2 is a block diagram of a step-size controller for an acoustic echo canceller according to an implementation of the present disclosure.

The present disclosure includes a coefficient calculation block 140 with an adjustable step size and a step-size controller 200 configured to detect an event and then choose if, and how, the adjustable step size should be changed. For example, upon detecting double-talk or an environment change, the step-size controller 200 may configure the coefficient calculation block 140 to continue adaptation with a different step size. The different step size may be a step size that is increased from a stored step size or decreased from the stored step size. The step-size controller 200 may also be configured to pause the adaptation in response to an event by setting the step size to zero, as described previously. In any case, after the event, the step-size controller may configure the coefficient calculation block to resume adapting using the step size used before the event (i.e., the stored step size).

FIG. 2 illustrates a block diagram of a step-size controller for an AEC according to an implementation of the present disclosure. The step-size controller 200 is configured to receive a desired signal (i.e., input signal (d[n]) and a residual error (i.e., output signal e[n]). The signals are provided to a fast Fourier transform (FFT) block 210 to place the signals into a frequency domain. The frequency domain signals are then correlated by a correlation calculator 220 to derive an average cross-correlation, $r_{de}$, (i.e. mean_corr) and a variance, $(\sigma_d)^2$, (i.e., var_corr). The variance is then normalized (i.e., DIV) by a threshold that is based on a moving average (i.e., mov. average) of the variance to generate a ratio of the variance (i.e., var_ratio). In other words, the step-size controller 200 is configured to compute the values corresponding to the quality of convergence described in Equation (2). The values are provided to a step-size adjustor 230 that is configured to determine an event based on these values.

The step-size adjustor 230 of the step-size controller 200 is further configured to receive the active step size (i.e., para_mu) and a stored step size (i.e., st_para_mu). The active step size may be greater than the stored step size, less than the stored step size, or zero. The step size adjuster may be further configured to set the active step size to the stored step size after the event concludes.

The step-size adjustor 230 is further configured to receive a parameter (i.e., alpha, beta) corresponding to an amount of increase or an amount of decrease in the step size value. The step-size adjustor 230 is further configured to receive a signal (active condition) corresponding to a period (i.e., operation time) corresponding to an iteration (i.e. state). In other words, the AEC may use a step size for an operation time before determining if it needs to be adjusted. The step-size adjustor 230 is further configured to receive a signal (ctrl_comp) corresponding to the convergence of the filter. The signal (ctrl_comp) can be based on a comparison between a current variance (var_corr) and a previous variance (i.e., delayed variance). If the current variance is smaller than the previous variance, the correlation may be moving towards unity, and this condition may correspond to good convergence. As a result, the signal (ctrl_comp) may be set to a first value (i.e., HIGH) to indicate a good convergence. Alternatively, if the current value of the variance is larger than the previous variance, the correlation may be moving away from unity, and this condition may correspond to bad correlation. As a result, the signal (ctrl_comp) may be set to zero (i.e. LOW) to indicate a bad convergence.

The step-size controller 200 is configured to output a step size (para_mu) that can be used by the coefficient calculation block 140 in order to adapt the coefficients of the filter 130. The step-size controller may be configured to output a detect signal (i.e., detect) that has a first value (e.g., HIGH, 1) when a double-talk or environment-change (i.e., an event) is detected and a second value (e.g., LOW, 0) when no event is detected. The step-size controller 200 can control the step size (para_mu) based on a state. Accordingly, the step-size adjustor may be further configured to output a state signal (i.e., state) to indicate a current state of the step-size adjustor, which can be used to help determine a subsequent state.

Figure 3:
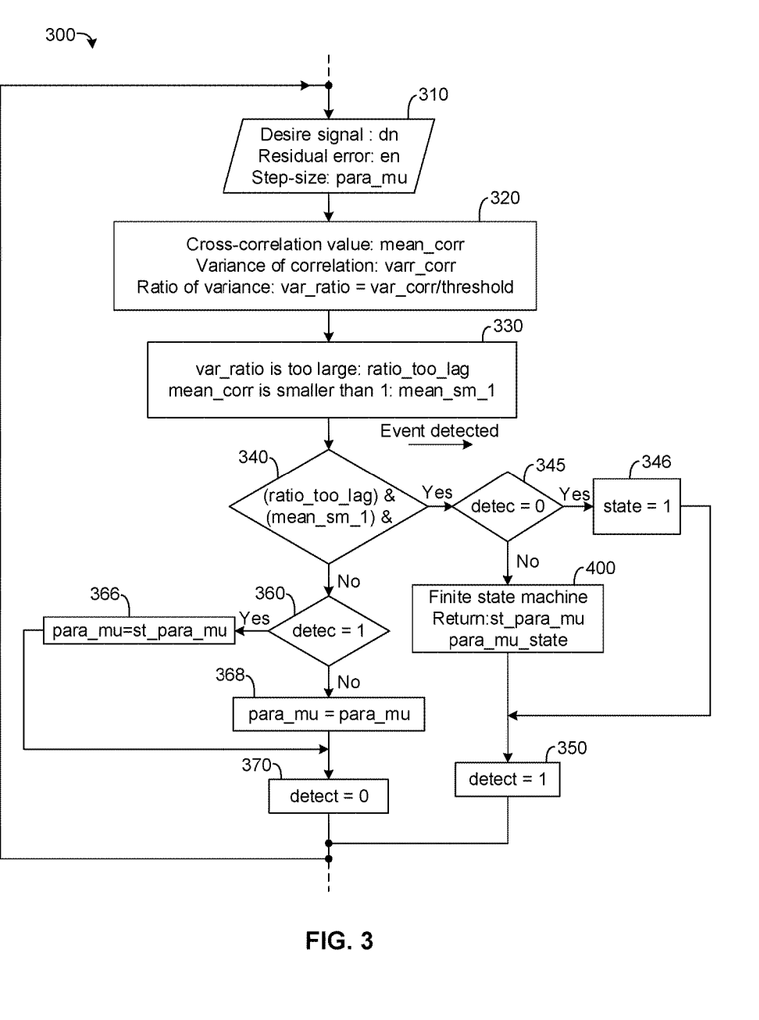
FIG. 3 is a flow chart illustrating the operation of a step-size controller for an acoustic echo canceller according to an implementation of the present disclosure.

FIG. 3 is a flowchart describing the operation of the step-size controller of FIG. 2 according to an implementation of the present disclosure. As described in conjunction with FIG. 2, the method 300 for operation begins by the step-size controlling receiving 310 the desired signal (d[n]), the residual error signal (e[n]), and a current step size (para_mu). The step-size controller is configured to compute 320 a cross-correlation value (i.e., mean_corr), a variance of correlation (i.e., var_corr), and a ratio of the variance of correlation to a threshold (i.e., var_corr/threshold). If the ratio is characterized as large (e.g., by a threshold) and the cross-correlation value is characterized as small (e.g., by a threshold), then an event may be detected. For example, if the ratio of the variance exceeds a threshold and the cross-correlation value is less than one (e.g., by an amount) then a double-talk and/or an environment change event can be detected. When an event is detected, the method 300 can make a series of decisions regarding the step size based on a finite state machine.

Figure 4:
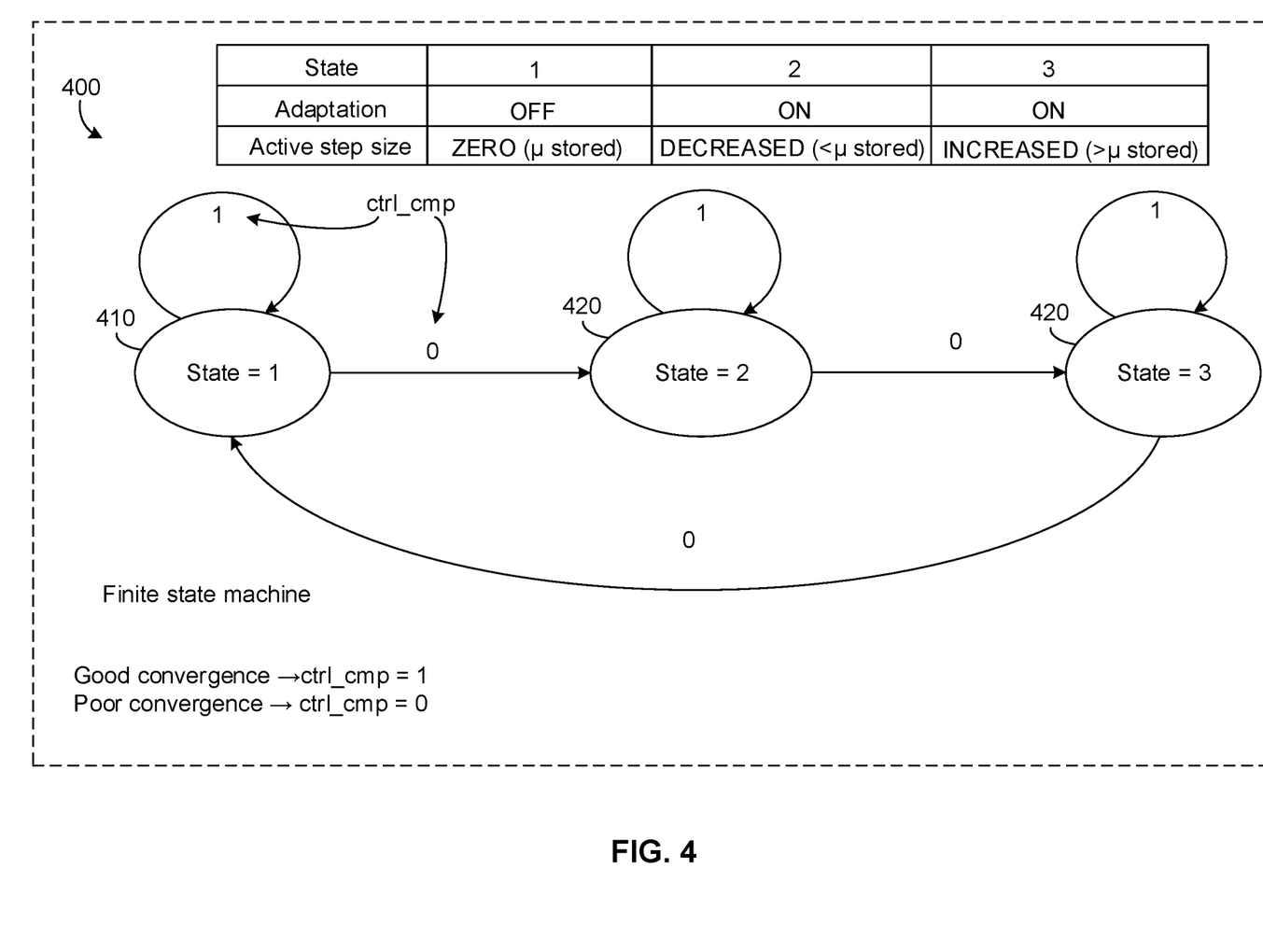
FIG. 4 is a state diagram of a finite state machine for a step-size controller according to an implementation of the present disclosure.

FIG. 4 is a state diagram of a finite state machine. The finite state machine 400 includes states of the step-size controller and conditions for remaining in a state and changing states. The finite state machine 400 includes a first state 410 (i.e., state=1), a second state 420 (i.e., state=2), and a third state 430 (i.e., state=3). Movement amongst the states may be controlled by a control comparison (i.e., ctrl_comp) that corresponds to a comparison between a current variance (i.e., $\sigma_d^2$ for the current iteration) and a previous variance (i.e., $\sigma_d^2$ for a previous iteration). For example, a current variance that is less than or equal to a previous variance (i.e., a better variance) may correspond to a control comparison of one (ctrl_comp=1). Alternatively, a current variance that is larger than a previous variance (i.e., a worse convergence) may correspond to a control comparison of 0 (ctrl_comp=0).

An event may trigger the step-size controller to enter the first state. In the first state (i.e., state=1), the step size may be made zero (i.e., para_mu=0). In other words, in the first state 410, the adaptation of the filter coefficients (see Equation 1) is stopped. Additionally, the step size before the event (i.e., the pre-event step size) is stored (i.e., st_para_mu) so that when the event concludes, the step size may be restored to the value prior to the event (i.e., para_mu=st_para_mu). On a step-wise basis, the step-size controller may remain in the first state 410 while the convergence is good (i.e., ctrl_cmp=1) but may change from the first state (i.e., state=1) to the second state (i.e., state=2) if the convergence is determined to be poor (i.e., ctrl_cmp=0).

In the second state (i.e., state=2), the adaptation is resumed by making the step size nonzero. The step size is reduced, however, from the stored value (i.e., para_mu<st_para_mu). The reduction may be accomplished using a division (e.g., para_mu=st_para_mu/beta) where an amount of the reduction is based on a defined parameter for division (i.e., beta). Alternatively, the reduction may be accomplished using a subtraction (e.g., para_mu=st_para_mu−alpha) where an amount of the reduction is based on a defined parameter for subtraction (i.e., alpha). The step-size controller may remain in the second state 420 while the convergence is good (i.e., ctrl_cmp=1) but may change from the second state (i.e., state=2) to the third state (i.e., state=3) if the convergence is determined to be poor (i.e., ctrl_cmp=0).

In the third state (i.e., state=3), the adaptation continues but the step size is increased. from the stored step size value (i.e., para_mu>st_para_mu). The increase may be accomplished using a multiplication (e.g., para_mu=st_para_mu*beta) where an amount of the increase is based on a defined parameter for multiplication (i.e., beta). Alternatively, the increase may be accomplished using an addition (e.g., para_mu=st_para_mu+alpha) where an amount of the increase is based on a defined parameter for addition (i.e., alpha). The step-size controller may remain in the third state 430 while the convergence is good (i.e., ctrl_cmp=1) but may change from the third state (i.e., state=3) to the first state (i.e., state=1) if the convergence is determined to be poor (i.e., ctrl_cmp=0).

Returning to FIG. 3, when the first decision 340 determines that an event is occurring and the second decision 345 determines that the event is new (i.e., detec=0) then the step-size controller enters 346 a first state (i.e., state=1) of the finite state machine 400 and sets 350 the flag for detection (i.e., detect=1) to indicate to a subsequent iteration that an event has occurred. If on a subsequent iteration, the first decision 340 that the event is occurring and the second decision 345 determines that the event existed in a previous iteration (i.e., detec=1), then the step-size controller enters the state determined by the finite state machine 400 to obtain the step size and the flag is maintained to show that the event remains active.

When the first decision 340 determines that no event is occurring and a third decision 360 determines that the event was present on a pervious iteration (i.e., that the event has just ended), then the step size is restored 366 to the value it was prior to the event (i.e., para_mu=st_para_mu) and the flag for detecting is returned 370 to zero to indicated that no event is occurring. If on a subsequent iteration, the first decision 340 determines that no event is occurring and the third decision 360 determines that no event was present on the previous iteration, then the step size is unchanged 368 (i.e, para_mu=para_mu) and the detection flag is maintained at zero to indicate that no event is occurring.

Figure 5:
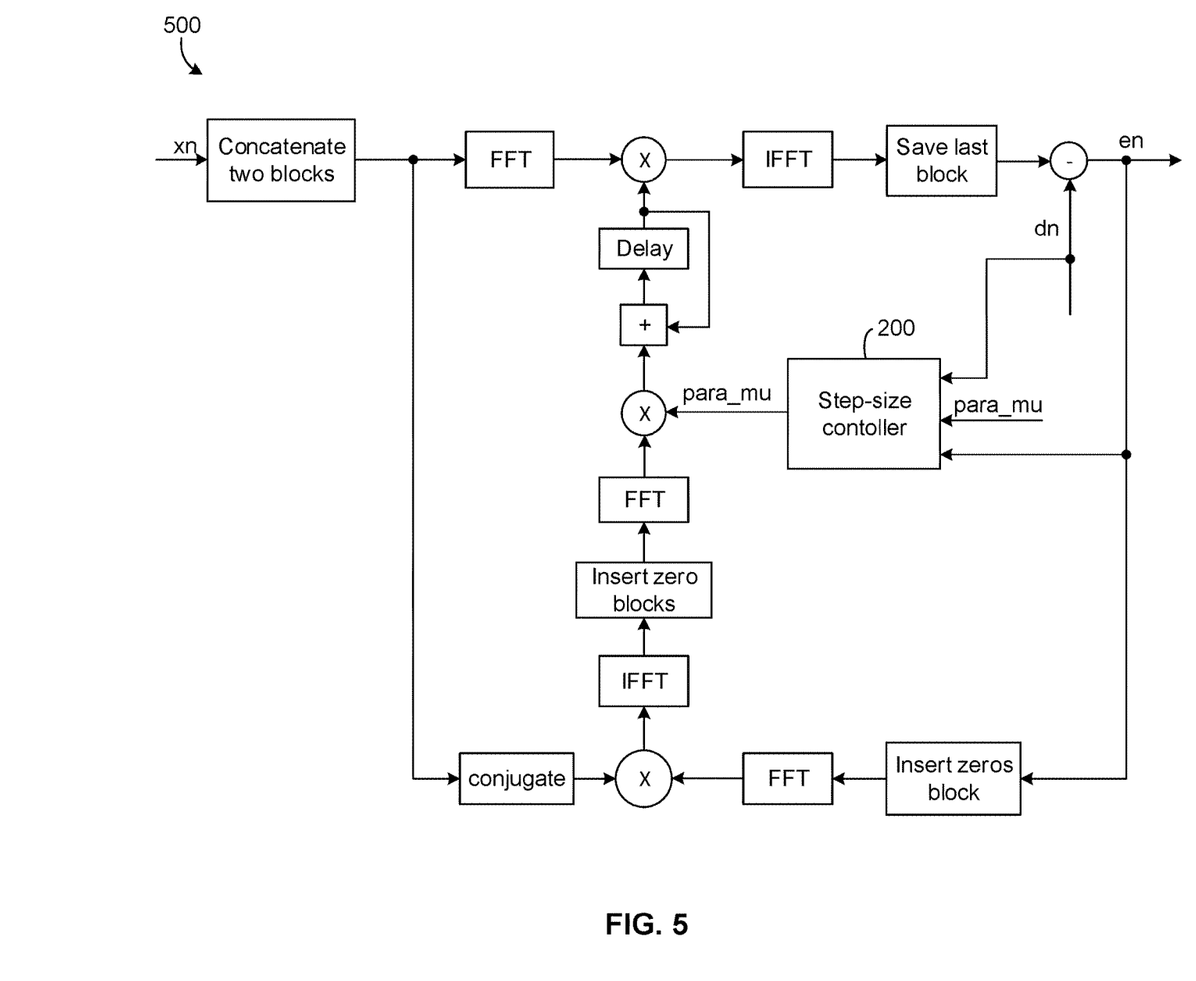
FIG. 5 is a block diagram of an adaptive filter having a step-size controller according to an implementation of the present disclosure.

The step-size controller 200, the coefficient calculation block 140, and the filter 130 may be collectively referred to as an adaptive filter 500. FIG. 5 is a block diagram of an adaptive filter for the AEC according to an implementation of the present disclosure. The adaptive filter is a frequency domain implementation. Accordingly, the adaptive filter 500 includes frequency transformation blocks (i.e., FFT, IFFT) to transform time domain signals to frequency domain, and vice versa. The adaptive filter 500 is configured to receive a reference signal x[n] (e.g., signal at far microphone) and an input signal, d[n] (e.g., signal at near microphone) and to output an output signal, e[n] after echo removal. The adaptive filter 500 includes a filtering portion that can be implemented as a finite impulse response (i.e, FIR) filter configured to generate a weighted sum of delayed input signals. The weights (i.e, coefficients) of the filter may be iteratively converged using a normalized least mean squares (NLMS) algorithm. The NLMS algorithm is configured to iterate with a variable step size (VSS) that can be controlled by the disclosed step-size controller.

The disclosed step-size controller uses a finite-state machine controlled by a value based on a quality of convergence. The finite state machine eliminates a need to distinguish between a double-talk condition and a changing environment condition to control the step size. Additionally, the finite state machine allows the step-size controller to (i) not adapt coefficients, (ii) adapt coefficients with a decreased step size, or (iii) adapt coefficients with an increased step size. These options can allow for a faster convergence of the adaptive filter in response to a double talk event or a changed environment event compared to other approaches that use a fixed step size or include fewer options (i.e., states) for step size adjustment.

Figure 6:
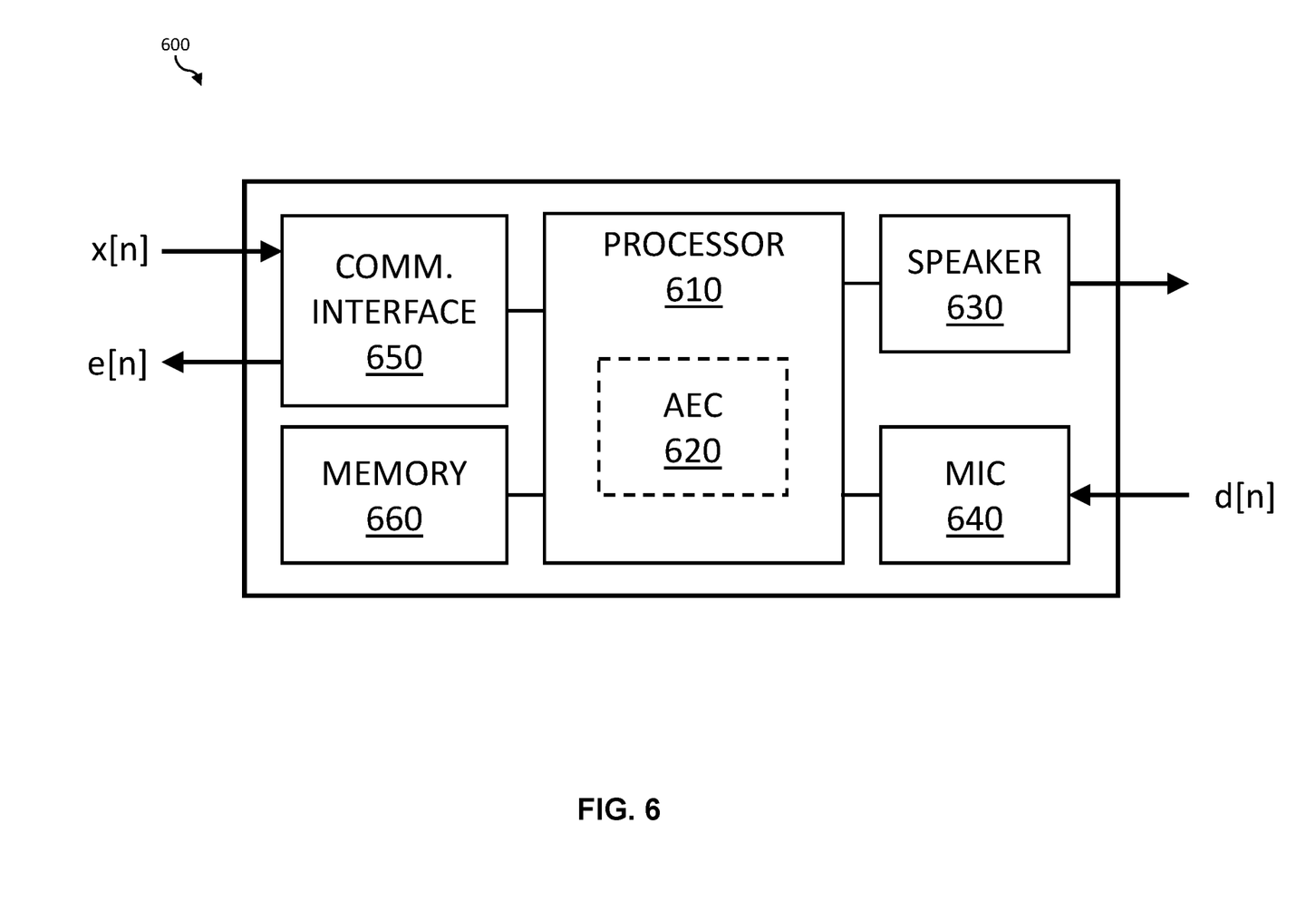
FIG. 6 is a block diagram of an acoustic device for implementing an acoustic echo canceller according to an implementation of the present disclosure.

FIG. 6 is a block diagram of an acoustic device for implementing an AEC. The acoustic device 600 includes a processor 610, memory 660, a communication interface 650, a speaker 630, and a microphone 640. Some components of the acoustic device can be realized in digital electronic circuitry, integrated circuitry, specially designed ASICs (application specific integrated circuits), computer hardware, firmware, software, and/or combinations thereof.

The processor 610 can be generally or specifically configured to process instructions for execution. The processor 610 may be implemented as a single chip or as a chipset that includes multiple analog and digital processors. Likewise, the memory 660 may be implemented as a single memory or as multiple memories, possibly using different types of memory. In a possible implementation, multiple acoustic devices may be connected, with each device providing portions of the necessary operations (e.g., as a distributed system).

The memory 660 is computer readable and can be configured to store information within the acoustic device 600. In one implementation, the memory 660 is a volatile memory unit or units. In another implementation, the memory 660 is a non-volatile (i.e., non-transitory) memory unit or units. The memory 660 may also be another form of computer-readable medium, such as a magnetic disk, optical disk, or solid-state drive. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A computer program product can be stored in the memory 660. The computer program product may contain instructions that, when executed by acoustic device, can perform one or more methods, such as those described above. The computer program (also known as program, software, software application, or code) may include machine instructions to program the processor 610 to carry out the methods described herein. For example, the processor may be configured by an AEC program 620. The AEC program 620 can be implemented in a high-level procedural and/or object-oriented programming language, and/or in assembly/machine language.

The processor 610 may also communicate audibly with the microphone 640 using an audio codec, which may receive analog audio information from the microphone and convert it to usable digital information. An audio codec may likewise generate audible sound for a user, such as through a speaker 630 (e.g., in a handset of a device). Such sound may include sound from voice telephone calls, may include recorded sound (e.g., voice messages, music files, etc.) and may also include sound generated by applications operating on the acoustic device 600.

The communication interface 650 (e.g., USB, Bluetooth, Ethernet, wireless Ethernet, wired telephony) may be coupled to one or more input/output devices, such as a far mic/far speaker or a networking device such as a switch or router, e.g., through a network adapter.

The acoustic device may be implemented in a number of different forms. For example, it may be implemented as a wireless speaker (e.g., smart speaker), a wearable speaker (e.g., internet of things), or a wired speaker (e.g., conference hub). In addition, it may be implemented in a personal computer such as a laptop computer. Alternatively, it may be implemented as a mobile device (e.g., smart phone), personal digital assistant, or as another similar mobile device.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The invention claimed is:

1. An audio system, comprising:
   a speaker configured to play a transmitted signal to an environment;
   a microphone configured to receive a received signal from the environment, the received signal including an echo of the transmitted signal; and
   an echo canceller configured to cancel the echo of the transmitted signal from the received signal, the echo canceller including:
      an adaptive filter configured to model the environment to generate an echo estimate, the echo estimate subtracted from the received signal to cancel the echo of the transmitted signal from the received signal, the adaptive filter configured to:
         detect an event that causes a loss of convergence of the adaptive filter, the detection based on a variance of the received signal and on a cross-correlation between the received signal and an echo-cancelled signal at an output of the echo canceller,
         determine, during the event, an active step size according to a finite state machine, and
         adjust the adaptive filter according to the active step size.

2. The audio system according to claim 1, wherein the event is a double-talk event.

3. The audio system according to claim 1, wherein the event is a change in the environment.

4. The audio system according to claim 1, wherein the active step size during the event is different from the active step size prior to the event.

5. The audio system according to claim 1, wherein the adaptive filter is further configured to:
   store a step size prior to the event as a stored step size; and
   change the active step size to the stored step size after the event.

6. The audio system according to claim 5, wherein the finite state machine includes:
   a first state in which the active step size is made to be zero,
   a second state in which the active step size is decreased from the stored step size; and
   a third state in which the active step size is increased from the stored step size.

7. The audio system according to claim 6, wherein:
   the active step size is decreased in the second state using a division; and
   the active step size is increase in the third state using a multiplication.

8. The audio system according to claim 6, wherein:
   the active step size is decreased in the second state using a subtraction; and
   the active step size is increased in the third state using an addition.

9. The audio system according to claim 1, wherein the loss of convergence of the adaptive filter is based on a value of a convergence parameter GlEcc defined as:

$$\zeta_{MECC} = 1 - \frac{r_{de}}{\sigma_d^2}$$

wherein $r_{de}$ is the cross-correlation between the received signal and the echo-cancelled signal and $\sigma_d^2$ is the variance of the received signal.

10. The audio system according to claim 1, wherein the adaptive filter includes:
   a finite impulse response (FIR) filter having coefficients;
   a coefficient calculation block configured to apply a normalized least means squared (NLMS) algorithm to adjust the coefficients of the FIR filter to minimize a difference between a response of the FIR filter and a response of the environment; and
   a step-size controller configured to adjust the active step size of the NLMS algorithm during an event, the event being a double talk event or an environment change event.

11. A method for echo cancellation comprising:
   receiving a received signal from an environment, the received signal including an echo of a transmitted signal;
   generating an echo estimate using an adaptive filter configured to model the environment;
   subtracting the echo estimate from the received signal to cancel the echo of the transmitted signal from the received signal;
   detecting an event that causes a loss of convergence of the adaptive filter, the detection based on a variance of the received signal and on a cross-correlation between the received signal and an echo-cancelled signal at an output of the echo canceller;
   determining, during the event, an active step size according to a finite state machine; and
   adjusting the adaptive filter according to the active step size.

12. The method for echo cancellation according to claim 11, wherein the event is a double-talk event or a change in the environment.

13. The method for echo cancellation according to claim 11, further comprising:
   storing a step size prior to the event as a stored step size; and
   changing the active step size to the stored step size after the event.

14. The method for echo cancellation according to claim 13, further comprising:
   zeroing the active step size based on a first state of the finite state machine;
   decreasing the active step size below the stored step size based on a second state of the finite state machine; and
   increasing the active step size above the stored step size based on a third state of the finite state machine.

15. The method for echo cancellation according to claim 14, further comprising:
   using division to decrease the active step size below the stored step size; and
   using multiplication to increase the active step size above the stored step size.

16. The method for echo cancellation according to claim 14, further comprising:
   using subtraction to decrease the active step size below the stored step size; and
   using addition to increase the active step size above the stored step size.

17. The method for echo cancellation according to claim 11, wherein detecting the event that causes the loss of convergence of the adaptive filter comprises:
   computing the loss of convergence of the adaptive filter based on a value of a convergence parameter $\zeta_{MECC}$ defined as:

$$\zeta_{MECC} = 1 - \frac{r_{de}}{\sigma_d^2}$$

wherein $r_{de}$ is the cross-correlation between the received signal and the echo-cancelled signal and $\sigma_d^2$ is the variance of the received signal.

18. An echo canceller for an acoustic device, the echo canceller comprising:
   a finite impulse response (FIR) filter having coefficients to generate an echo estimate that is an estimate of an echo generated by an environment;
   a coefficient calculation block configured to apply a normalized least means squared (NLMS) algorithm to adjust the coefficients of the FIR filter to minimize a difference between a response of the FIR filter and the response of an environment; and
   a step-size controller configured to adjust an active step size of the NLMS algorithm during an event according to a finite state machine, the event being a double talk event or an environment change event, wherein the finite state machine includes:
      a first state in which the active step size is zero;
      a second state in which the active step size is greater than a step size before the event; and
      a third state in which the active step size is less than the step size before the event.

19. The echo canceller according to claim 18, wherein the step-size controller is configured to detect the double talk event or the environment change event based on a variance of a signal received at the echo canceller.

\* \* \* \* \*